United States Patent
Reyhanloo

(10) Patent No.: US 8,944,287 B2
(45) Date of Patent: Feb. 3, 2015

(54) METHOD FOR DISPENSING MILK PORTIONS IN DRINK PREPARATION MACHINES

(75) Inventor: Shahryar Reyhanloo, Lohn Ammansegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 1478 days.

(21) Appl. No.: 12/518,552

(22) PCT Filed: Dec. 17, 2007

(86) PCT No.: PCT/CH2007/000639
§ 371 (c)(1),
(2), (4) Date: Oct. 20, 2009

(87) PCT Pub. No.: WO2008/077264
PCT Pub. Date: Jul. 3, 2008

(65) Prior Publication Data
US 2010/0047406 A1 Feb. 25, 2010

(30) Foreign Application Priority Data
Dec. 27, 2006 (CH) ....................... 2112/06

(51) Int. Cl.
*B67D 1/12* (2006.01)
*A47J 31/44* (2006.01)

(52) U.S. Cl.
CPC .................................. *A47J 31/4485* (2013.01)
USPC .................... 222/66; 99/280; 99/285; 99/453

(58) Field of Classification Search
CPC ...... A47J 31/4485; B67D 1/1247; B67D 7/32
USPC ............ 222/23, 64, 66, 52; 99/285, 452, 280, 99/454, 453, 293; 426/231
See application file for complete search history.

(56) References Cited

U.S. PATENT DOCUMENTS

| | | | | |
|---|---|---|---|---|
| 4,790,239 A | * | 12/1988 | Hewitt | 99/279 |
| 5,285,718 A | * | 2/1994 | Webster et al. | 99/290 |
| 5,644,972 A | * | 7/1997 | Dahmen et al. | 99/280 |
| 5,901,880 A | * | 5/1999 | Clarke | 222/63 |
| 6,006,654 A | * | 12/1999 | Pugh | 99/293 |
| 6,626,086 B2 | * | 9/2003 | Eugster | 99/323.1 |

(Continued)

FOREIGN PATENT DOCUMENTS

| EP | 2036470 A1 * | 3/2009 |
|---|---|---|
| WO | WO 97/47376 | 12/1997 |

OTHER PUBLICATIONS

English translation of (EP 2 036 470), Jun. 28, 2013.*

(Continued)

*Primary Examiner* — Kevin P Shaver
*Assistant Examiner* — Robert Nichols, II
(74) *Attorney, Agent, or Firm* — Alston & Bird LLP

(57) ABSTRACT

The invention relates to a method for dispensing milk portions in drink preparation machines having a milk fill level monitoring unit for a milk container. According to the method, one delivery of a milk portion from the milk container, said delivery being controlled by a device control electronic system, is only carried out completely and with a sufficient quantity of milk when during the delivery of the milk portion, the milk fill level monitoring unit signals a drop in the fill level of the milk below a threshold value.

2 Claims, 4 Drawing Sheets

(56) References Cited

U.S. PATENT DOCUMENTS

| | | | |
|---|---|---|---|
| 7,475,628 B2 | 1/2009 | Lüssi | |
| 7,600,467 B2* | 10/2009 | Coccia et al. | 99/293 |
| 7,798,373 B1* | 9/2010 | Wroblewski et al. | 222/209 |
| 2004/0195263 A1* | 10/2004 | Lassota | 222/23 |
| 2007/0031558 A1* | 2/2007 | Lussi | 426/520 |
| 2008/0053313 A1* | 3/2008 | Goltenboth | 99/290 |
| 2009/0314165 A1* | 12/2009 | Blockwoldt et al. | 99/288 |
| 2012/0137894 A1* | 6/2012 | Goeltenboth | 99/285 |
| 2013/0344205 A1* | 12/2013 | Oh | 426/232 |

OTHER PUBLICATIONS

International Search Report for International Application No. PCT/CH2007/000639 Mar. 14, 2008.

International Preliminary Report on Patentability for International Application No. PCT/CH2007/000639 issued on Sep. 22, 2009.

* cited by examiner

METHOD FOR DISPENSING MILK PORTIONS IN DRINK PREPARATION MACHINES

BACKGROUND

1. Field of the Invention

The invention relates to a method for dispensing milk portions in drink preparation machines having a milk fill level monitoring unit for a milk container, such as coffee machines with a milk container provided for preparing Capuccino. The invention further relates to a milk fill level monitoring unit for a milk container.

2. Description of Related Art

In coffee machines, producing the milk froth for the Capuccino and the heating of milk is carried out in many cases in a frothing device using the Venturi principle. A negative pressure is generated with a suitable steam jet, which sucks the milk from the supply container (milk container) via a hose system and guides it into the nozzle of the frothing device. In the nozzle, the milk is brought together with the steam and the milk-steam-air mixture leaves the frothing device and runs into the cup through a steady outlet jet. If air is added to the cold milk during the extraction, warm milk with a milk froth located thereover is produced in the cup. Without air being added, the milk can only be heated.

If too little or no milk is present in the milk container and the sequence of the milk product deliveries, in particular the Capuccino delivery in the coffee machine controller is fixedly programmed, the consumer only receives a coffee without milk or with too little milk and milk froth. For the user this is irksome since he must repeat the entire process once again to obtain a perfect Capuccino (milk product) and throw away the coffee that has possibly already been withdrawn. This means a waste of resources and also has financial implications, particularly if the consumer must pay a fixed amount for the Capuccino withdrawal, whether this be in the office area or in the restaurant area.

If the milk supply is interrupted, whether this be because no or too little milk is available, this does not form a homogeneous milk outlet jet from the nozzle during withdrawal. In addition to the first annoyance, there is the added factor that the front side of the coffee machine can be contaminated by milk, water and steam splashes.

In addition, since in most cases the milk container is not transparent, it is difficult for the consumer to monitor the fill level of the milk. The supplied milk should be stored in a cooled manner as far as possible. This is achieved in many cases with an insulating container (double-walled structure with an evacuated intermediate space) or with a small refrigerator using a Peltier element. In these devices, it is not possible to monitor the milk fill level without opening the container. In addition, this is also impractical in most cases and is frequently forgotten.

There are indeed drink preparation machines such as, for example, the "Thermoplan Tiger" from Thermoplan which have an integrated milk system with a cooled milk tank in the substructure. The device additionally has a capacitively operating milk fill level monitoring unit. Naturally however, the milk fill level in the milk tank is not readily apparent to the user of the drink preparation machine even in this case. It has additionally been found that in the event of the milk fill level monitoring unit being tripped, i.e. in the event of the capacitively operating sensor being tripped in this device, a milk dispensing process which is possibly just being executed, is not carried out completely but is prematurely interrupted.

Known from WO 97/47376 is a frothing apparatus for milk in which milk can be extracted from a milk container via a suction tube by means of a pump under the control of a microprocessor controller and can be fed to a mixing device in which the extracted milk can be mixed with steam and air and can be frothed in this manner. This frothing apparatus comprises a sensor for determining the fill level in the milk container, which sensor is disposed relative to the bottom of the milk container at the same level as a suction opening for extracting the milk, which suction opening is disposed at the lower end of the suction tube, wherein signals from the sensor can be received by the microprocessor controller.

SUMMARY OF VARIOUS EMBODIMENTS

It is thus the object of the invention to provide an improved and more user-friendly method for preparing drinks with milk or milk constituents in drink preparation machines such as coffee machines. Furthermore, a suitable milk fill level monitoring unit will be provided for carrying out the method.

This object is achieved by the features of claims 1 and 2.

The solution starts from the fact that a delivery of a milk portion from the milk container, controlled by the electronic device control system, is carried out completely and with a sufficient quantity of milk even when, during a delivery of the milk portion, the milk fill level monitoring unit signals a drop in the fill level of the milk below a threshold value.

At the same time, in order to further increase the user friendliness of the drink preparation machine, when the fill level of the milk drops below the threshold value, the user is given an indication on a display that the milk container is empty and further deliveries of milk portions are blocked until the milk container is sufficiently filled again or at least until the milk fill level monitoring unit releases this function again.

By ensuring that a milk delivery process, once initiated, is always completed, it is achieved that the milk outlet jet always remains homogeneous and as a result jet irregularities and splashes are reliably avoided.

Naturally, the necessary conditions for this must also be provided on the hardware side. Thus, it must be ensured by constructive measures that in the event of the threshold value sensor being tripped, there is still sufficient milk in the milk container to actually complete the initiated process. However, since such measures are substantially questions of dimensioning in most cases, e.g. by specifying the height of the suction opening of a suction tube and the level of triggering of a threshold value signal, in the exemplary embodiment shown, reference is merely made to one possible embodiment.

Various principles of action can be used in the threshold value sensors. Thus, for example, sensors using the capacitive or resistive principles can be used. Capacitive monitoring has the advantage that this is simpler to achieve electronically. However, such circuits are fundamentally known to the person skilled in the art which is why they are not explained in detail in the following.

Due to the possibility that either an internally or an externally disposed milk container can be used, the user friendliness can be further improved, in particular if a modular extension concept is provided (i.e. a suitable milk container can be made available to the drink preparation machine).

In the case of an externally disposed milk container, an external electronic evaluation system attached to the milk container can also be provided. However, this is usually only used for fill level information and with the exception of signal relaying functions, has no further functions on the electronic device control system of the drink preparation machine. However, it can nevertheless be very practical and conducive to clarity to display the fill level directly on the 'affected' device.

The fill level monitoring according to the invention in a coffee machine will be explained in detail hereinafter for two examples using the resistively acting sensor principle with reference to drawings.

DETAILED DESCRIPTION

Figure 1:
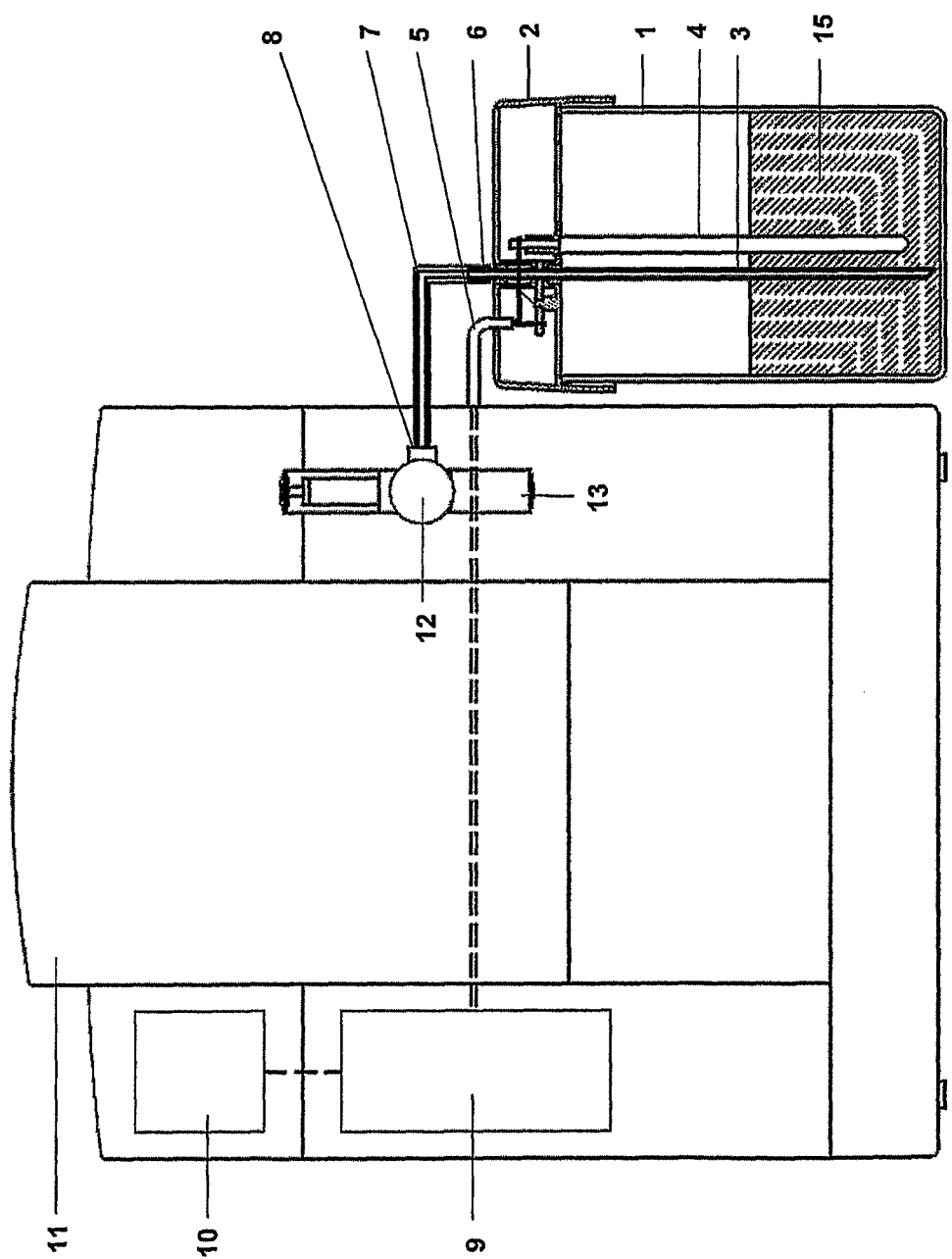
FIG. 1 shows a schematic diagram of a coffee machine with a milk container provided.

FIG. 1 shows a schematic diagram of a coffee machine with a milk container 1 provided.

In this case, milk is poured into the milk container 1 which is located in a coffee machine 11 or preferably outside said coffee machine. This liquid container 1 is preferably an insulating container and can be made of metal, glass or plastic. As a result, the milk can be stored for some time in this container. The milk is sucked by a suction tube 3 with a flexible hose 7 to a milk frother 12 with a milk outlet 13. On one side the hose 7 is plugged onto a hose connection 6 of a container lid 2 of the milk container 1 and on the other side it is plugged onto a docking point 8 of the milk frother 12. Both connections can be removed by the user for cleaning.

The suction tube 3 and a measuring rod 4 are fastened on the container lid 2 at a suitable distance with respect to one another. The suction tube 3 is required for extracting the milk and is made of an electrically conductive material, preferably metal. The shorter, likewise electrically conductive measuring rod 4, which can also be implemented as a tube closed at the bottom, is fixed parallel to the suction tube 3 on the container lid 2. A temperature measurement can also be integrated in the measuring rod 4 by which means the milk temperature can be measured or monitored. If the temperature is too high, this can be notified to the consumer directly via a display 10 on the coffee machine 11. The two elements suction tube 3 and measuring rod 4 are connected electrically to an electronic device control system 9 of the coffee machine 11 by means of a signal line 5. The fill level of the milk can be monitored by means of variation in conductance between the suction tube 3 and the measuring rod 4. The conductivity of the milk is higher than that of air. The principle can also be applied to other liquids such as water, tea, etc. If the milk level falls below the (shorter) measuring rod 4, there is a marked jump in the measurement signal. This signal is evaluated directly in the electronic device control system 9 or evaluated with an external display 16. When the signal evaluation is made directly by the electronic device control system 9, the delivery of milk products can be interrupted or blocked until sufficient milk has been topped up again. This ensures that the outlet jet from the milk outlet 13 of the milk frother 12 always remains homogeneous.

The electronic device control system 9 can also release a certain follow-up quantity 14 so that the actuated delivery is not interrupted if the set milk delivery quantity does not exceed a residual quantity 15 in the milk container 1. The request for topping up the milk is only made at the end of the milk delivery. The fill level minimum (alarm) can be notified to the consumer with various possibilities for display; it can be accomplished visually by means of a display indication, a luminous LED or pictogram or the like or it can be effected audibly by means of a beeper, buzzer, vibrator or the like.

The applied measurement principle also functions when the suction tube 3 and the measuring rod 4 are arranged coaxially.

If the milk container 1 is made of metal, the fill level monitoring can also be made between the container wall and the measuring rod 4 and the suction tube 3 could then be made of a non-conducting material. The corresponding signal line 5 must then naturally not be secured to the suction tube 3 but to the container wall of the milk container 1.

Figure 2:
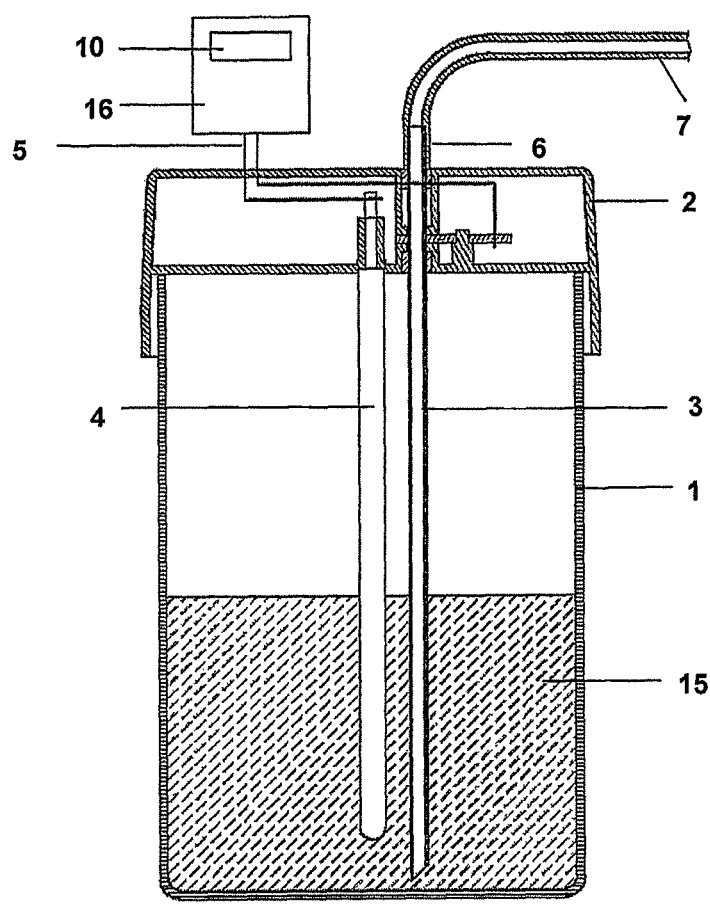
FIG. 2 shows a sectional drawing of the milk container with an external electronic evaluation system in a first embodiment and FIG. 3 shows a simplified sectional drawing of the arrangement of the elements of the milk fill level monitoring unit in the milk container according to the first embodiment.

FIG. 2 shows a sectional drawing of the milk container 1 with an external electronic evaluation system 16 in a first embodiment. In this case, the measurement signal from the threshold value sensor is not connected directly to the electronic device control system 9 of the drink preparation machine but is fed to the external electronic evaluation system 16. When the signal evaluation is made with an external electronic evaluation system 16, the product delivery is not prevented but merely indicated when the fill level is fallen below or the liquid container 1 is empty. If the display 10 on the external electronic evaluation system 16 is not noted by the consumer and a Capuccino delivery is triggered nevertheless, the jet from the milk outlet 13 is not homogeneous when the fill level is fallen below. The fill level minimum can be displayed to the consumer with similar means as on the drink preparation machine.

Figure 3:
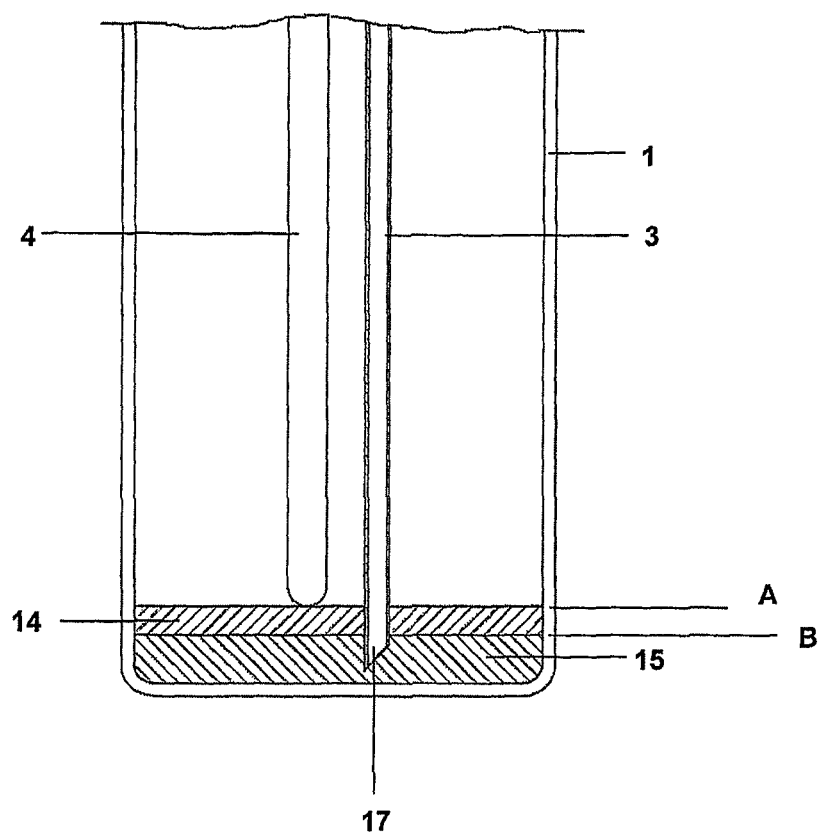

FIG. 3 shows another simplified sectional drawing of the arrangement of the elements of the milk fill level monitoring unit in the milk container according to the first embodiment. The suction tube 3 projects deeper into the milk container 1 than the shorter measuring rod 4. If the fill level falls below the level A, the lower end of the measuring rod 4 no longer touches the milk and the measured conductance between the suction tube 3 and the measuring rod 4 is then much lower. In this exemplary embodiment, the level A therefore designates the mentioned threshold value. Nevertheless, milk can be further extracted via the suction tube 3 until the suction opening 17 of the suction tube is exposed (indicated as level B) and only a residual quantity 15 remains in the milk container. The amount of milk which can be extracted between level A and B is designated as the follow-up quantity 14 and is determined in such a manner that when the method according to the invention is being used to deliver milk portions, the delivery of milk portions can always be completed. The follow-up quantity 14 is therefore the same as or greater than the largest amount of milk required per drink selection.

Figure 4:
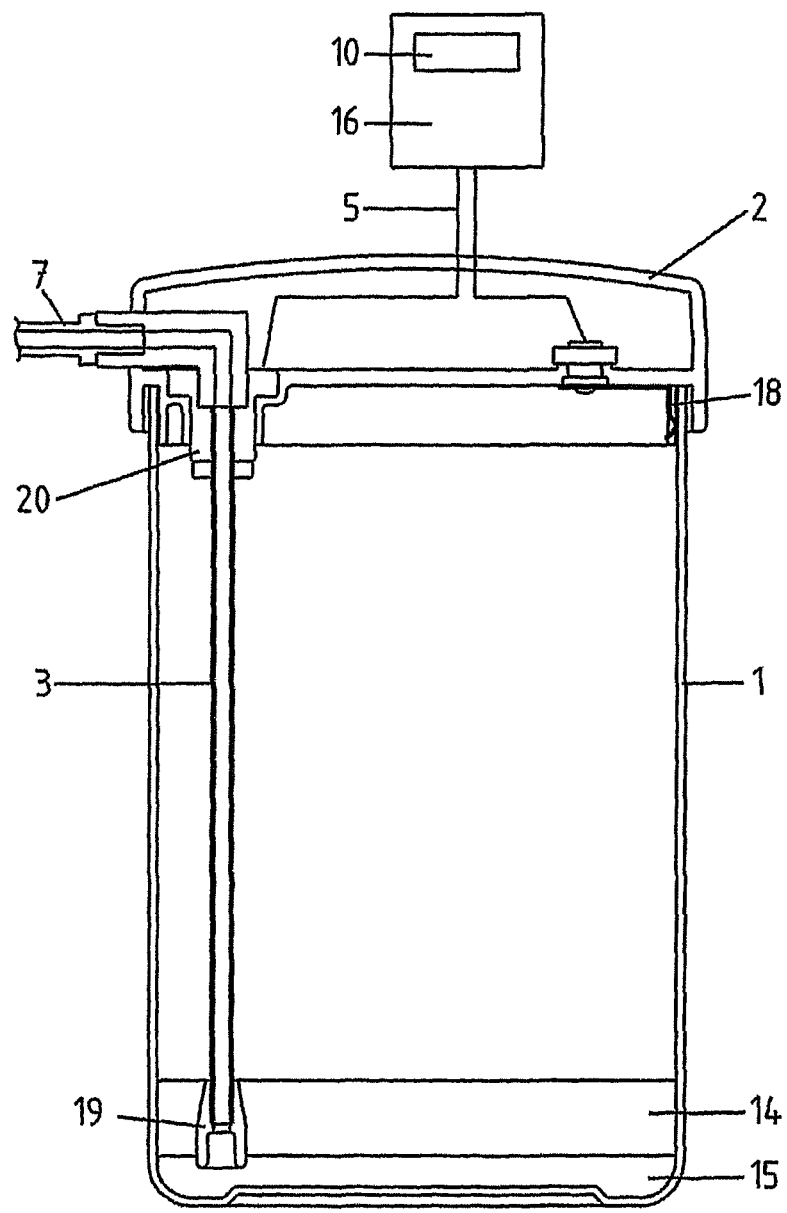
FIG. 4 shows a sectional drawing of the milk container with an external electronic evaluation system in a second embodiment.

FIG. 4 finally shows a sectional drawing of the milk container with an external electronic evaluation system in a second embodiment. In this case, the milk container 1 is made of metal (or an electrically conductive material). Thus, the fill level monitoring can also be made directly between the milk container 1 and the suction tube 3. This is a more cost-effective solution. In this case, the suction tube 3 must be constructed of two materials. The upper part of the suction tube 3 is here made of an electrically conductive material (preferably metal tube), the lower part, in this case a suction part 19, is made of a non-conductive material (preferably plastic or rubber). Both parts must be tightly connected to one another. The signal lines 5 are connected by means of a contact spring 18 and a conducting connecting piece.

The evaluation signal is generated by measuring the conductivity between the suction tube 3 and the milk container 1. For this purpose, the upper end of the suction tube 3 and the milk container 1 are electrically connected to the external electronic evaluation system 16. If the milk level drops below the electrically conducting part of the suction tube, a marked jump in the measurement signal takes place, However, the suction part 19 can still extract milk from the milk container 1. The length of the non-conducting suction part 19 determines the residual quantity 15 and the follow-up quantity 14 in the milk container 1.

The invention claimed is:

1. A drink preparation machine in combination with a milk container and a milk fill level monitoring unit, wherein the drink preparation machine has an electronic device control system, a display and a milk frother, and wherein a suction tube of the milk container is connected via a tube or hose to the milk frother and wherein the suction tube dipping into the milk container has a suction opening and a measuring rod likewise dipping into the milk container to form a threshold value and a capacitively or resistively operating threshold value sensor is provided, wherein the electronic device control system is configured to control delivery of a milk portion from the milk container to the frother, wherein the milk fill level monitoring unit is configured to provide a signal indicating a drop in the fill level of the milk below a threshold value during the delivery of the milk portion or to release the delivery of a milk portion, and wherein the display is configured to present an indication to a user that the milk container is empty when the fill level of the milk drops below the threshold value, wherein the suction opening is disposed at the lower end of the suction tube closer to the bottom of the milk container than a lower end of the measuring rod, and a vertical distance between the suction opening on the suction tube and the lower end of the measuring rod is arranged in such a manner that, when the fill level of the milk drops below the threshold value, a minimal predetermined residual volume of milk can still be extracted, and wherein the electronic device control system is configured to control the delivery of milk portions based on the signal provided by the milk fill level monitoring unit so that, after an extraction of the minimal predetermined residual volume of milk, further deliveries of milk portions are blocked via the electronic device control system until the delivery of a milk portion is released again by the milk fill level monitoring unit.

2. The drink preparation machine according to claim 1, wherein the milk container is located externally with respect to the drink preparation machine and an external electronic evaluation system attached to the milk container is provided.

* * * * *